US012483836B2

(12) United States Patent
Yang et al.

(10) Patent No.: US 12,483,836 B2
(45) Date of Patent: Nov. 25, 2025

(54) COAXIAL SPEAKER

(71) Applicant: AAC Microtech (Changzhou) Co., Ltd., Jiangsu (CN)

(72) Inventors: Huhu Yang, Changzhou (CN); Wei Wei, Changzhou (CN); Zhaoyu Yin, Changzhou (CN); Zhizhu Chen, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 221 days.

(21) Appl. No.: 18/533,115

(22) Filed: Dec. 7, 2023

(65) Prior Publication Data

US 2024/0348981 A1 Oct. 17, 2024

Related U.S. Application Data

(63) Continuation of application No. PCT/CN2023/087520, filed on Apr. 11, 2023.

(51) Int. Cl.

*H04R 9/02* (2006.01)
*H04R 7/18* (2006.01)
*H04R 9/04* (2006.01)
*H04R 9/06* (2006.01)

(52) U.S. Cl.

CPC ............... *H04R 9/025* (2013.01); *H04R 7/18* (2013.01); *H04R 9/045* (2013.01); *H04R 9/06* (2013.01); *H04R 2400/11* (2013.01)

(58) Field of Classification Search

CPC ........ H04R 9/025; H04R 9/063; H04R 9/045; H04R 9/06; H04R 1/24; H04R 2400/11

See application file for complete search history.

(56) References Cited

FOREIGN PATENT DOCUMENTS

| | | | | |
|---|---|---|---|---|
| CN | 217721455 U | * 11/2022 | | H04R 7/04 |
| JP | 2024527649 A | * 7/2024 | | H04R 9/02 |

* cited by examiner

*Primary Examiner* — Sunita Joshi

(74) *Attorney, Agent, or Firm* — Wiersch Law Group

(57) ABSTRACT

A coaxial speaker is disclosed. The coaxial speaker includes a magnetic circuit system and two sounding units. The magnetic circuit system includes a ring magnetic unit, a magnet and a yoke arranged on an outer side of the ring magnetic unit, and a first ring magnet sleeved on an insert inserted into an inner side of the ring magnetic unit. Magnetic polarities of the inner and outer surfaces of the first ring magnet are opposite. The first ring magnet together with the ring magnetic unit forms a first magnetic gap for one sounding unit. The ring magnetic unit together with the magnet and the yoke forms a second magnetic gap for another sounding unit. Diaphragms of the two sounding units are fixed to the ring magnetic unit. The coaxial speaker improves the low-frequency performance.

8 Claims, 3 Drawing Sheets

A-A

B-B

COAXIAL SPEAKER

FIELD OF THE PRESENT DISCLOSURE

The present disclosure relates to electroacoustic transducers, in particular to a coaxial speaker.

DESCRIPTION OF THE RELATED ART

A coaxial speaker in the related art includes a first sounding unit and a second sounding unit surrounding the first sounding unit and arranged coaxially with the first sounding unit. The first sounding unit is usually used for emitting high-frequency sound, and the second sounding unit is usually used for emitting low-frequency sound. However, since the vibration amplitude of the first sounding unit is limited, the first sounding unit can only emit high-frequency sound, resulting in the limitation of improving the low-frequency performance of the coaxial speaker.

Thus, it is necessary to provide a novel coaxial speaker to solve the problem.

SUMMARY

An objective of the present disclosure is to overcome the above technical problems and provide a coaxial speaker which improves the low-frequency performance.

In order to achieve the objective mentioned above, the present disclosure discloses a coaxial speaker including a magnetic circuit system, a support frame fixed to the magnetic circuit system, a first sounding unit, a second sounding unit, and an insert. The second sounding unit surrounds the first sounding unit and is arranged coaxially with the first sounding unit. The first sounding unit includes a first diaphragm and a first voice coil driving the first diaphragm for vibrating and sounding. The second sounding unit includes a second diaphragm and a second voice coil driving the second diaphragm for vibrating and sounding. The magnetic circuit system includes a bottom plate provided with a through hole, a ring magnetic unit fixed to the bottom plate, a magnet fixed to the bottom plate and arranged on an outer side of the ring magnetic unit, and a yoke fixed to the magnet. The insert is inserted into an inner side of the ring magnetic unit through the through hole. The magnetic circuit system further includes a first ring magnet sleeved on the insert. The first ring magnet includes an inner surface and an outer surface opposite to the inner surface. Magnetic polarities of the inner surface and the outer surface are opposite. The ring magnetic unit includes a second ring magnet fixed to the bottom plate, a ring yoke fixed to the second ring magnet, and a third ring magnet fixed to the ring yoke. A first magnetic gap is formed by the first ring magnet together with the second ring magnet, the ring yoke and the third ring magnet. A second magnetic gap is formed by the ring magnetic unit together with the magnet and the yoke. The first voice coil locates in the first magnetic gap, and the second voice coil locates in the second magnetic gap. An outer fixing part of the first diaphragm is fixed to the third ring magnet. An outer fixing part of the second diaphragm is fixed to the support frame, and an inner fixing part of the second diaphragm is fixed to the third ring magnet.

As an improvement, the insert is provided with a first step and a second step located above the first step. The second ring magnet is partially stacked on the first step. The first ring magnet abuts against the second step.

As an improvement, a conductive terminal is embedded in the insert for electrically connecting the first voice coil.

As an improvement, the yoke includes a main body part attached to the magnet and an extension part extending from the main body part in a direction away from the ring magnetic unit. The support frame is fixed to the extension part.

As an improvement, the second sounding unit further includes an elastic support member spaced apart from the second diaphragm and a skeleton connected between the second diaphragm and the elastic support member. An amount of the extension parts is two, the two extension parts are respectively arranged on two opposite long-axis sides of the coaxial speaker. An amount of the elastic support members is two, the two elastic support members are respectively arranged on two opposite short-axis sides of the coaxial speaker. The skeleton includes a plate part and two support arms extending from the plate part and respectively fixed to the two elastic support members. The plate part serves as a part of the second diaphragm. Each support arm is arranged between the support frame and the yoke. An outer fixing portion of each elastic support member is fixed to the support frame, and an inner fixing portion of each elastic support member is fixed to a corresponding one of the two support arms.

As an improvement, each elastic support member includes a flexible circuit board fixed to a corresponding one of the two support arms for electrically connecting the second voice coil and an auxiliary diaphragm fixed to a lower surface of the flexible circuit board away from the second diaphragm.

As an improvement, the first diaphragm, the second diaphragm and the skeleton are integrally formed.

As an improvement, the second ring magnet, the third ring magnet and the magnet are magnetized along a vibration direction of the first voice coil and the second voice coil. The second ring magnet and the third ring magnet have the same magnetic polarities facing each other, that are opposite to the magnetic polarity of the outer surface. A magnetic polarity of the magnet close to the yoke and the magnetic polarity of the outer surface are the same.

In the coaxial speaker according to the present disclosure, the first ring magnet is sleeved on the insert, the inner surface and the outer surface of the first ring magnet have opposite magnetic polarities, the first ring magnet together with the second ring magnet, the ring yoke and the third ring magnet forms the first magnetic gap for the first voice coil, the ring magnetic unit together with the magnet and the yoke forms the second magnetic gap for the second voice coil, the outer fixing part of the first diaphragm and the inner fixing part of the second diaphragm are fixed to the third ring magnet, thereby, the vibration amplitude of the first sounding unit can be increased, in addition, since the first ring magnet provides the magnetic field to the first voice coil, the low-frequency performance of the first sounding unit can be improved, thereby breaking the limitation of the first sounding unit only emitting high-frequency sound and improving the low-frequency performance of the coaxial speaker.

BRIEF DESCRIPTION OF THE DRAWINGS

In order to more clearly illustrate the technical solutions in embodiments of the present disclosure, the accompanying drawings used in the description of the embodiments will be briefly introduced below. It is apparent that, the accompanying drawings in the following description are only some embodiments of the present disclosure, and other drawings can be obtained by those of ordinary skill in the art based on the accompanying drawings without creative efforts, wherein.

DETAILED DESCRIPTION OF THE EMBODIMENTS

The technical solutions in embodiments of the present disclosure will be described clearly and completely below with reference to the accompanying drawings in the embodiments of the present disclosure. It is apparent that, the described embodiments are merely some of rather than all of the embodiments of the present disclosure. All other embodiments acquired by those of ordinary skill in the art without creative efforts based on the embodiments of the present disclosure shall fall within the protection scope of the present disclosure.

Figure 1:
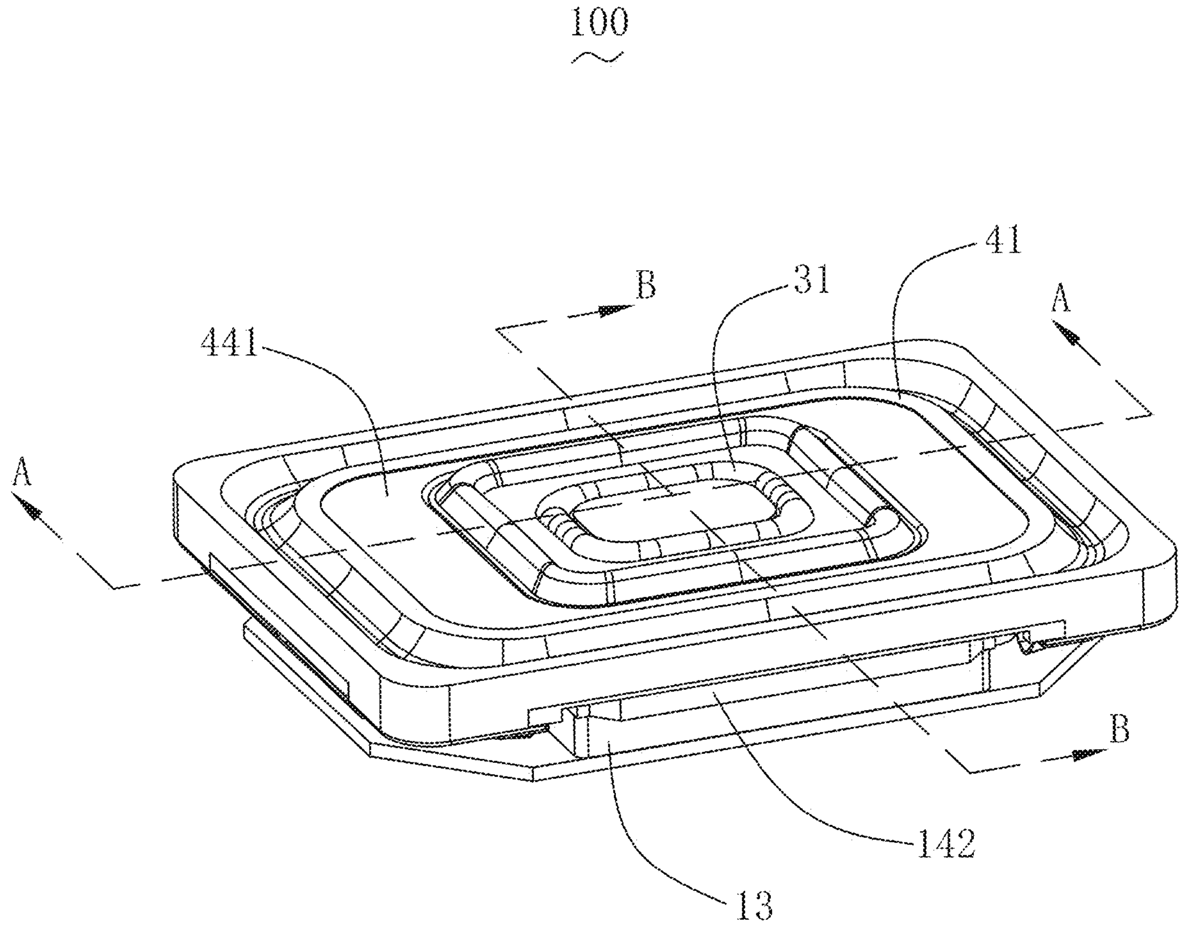
FIG. 1 is an isometric view of a coaxial speaker in accordance with an exemplary embodiment of the present disclosure.
Figure 2:
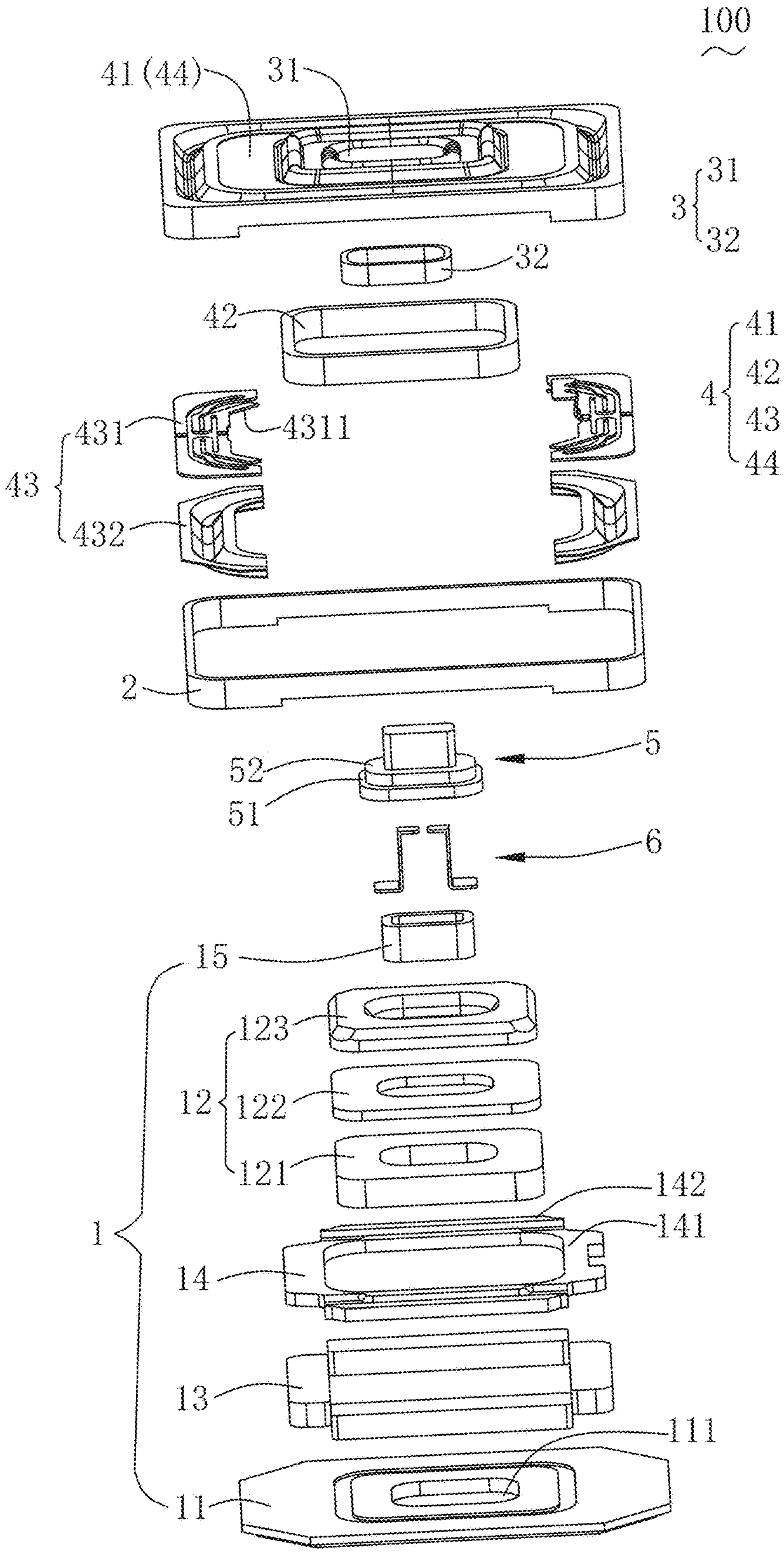
FIG. 2 is an exploded view of the coaxial speaker in FIG. 1.
Figure 3:
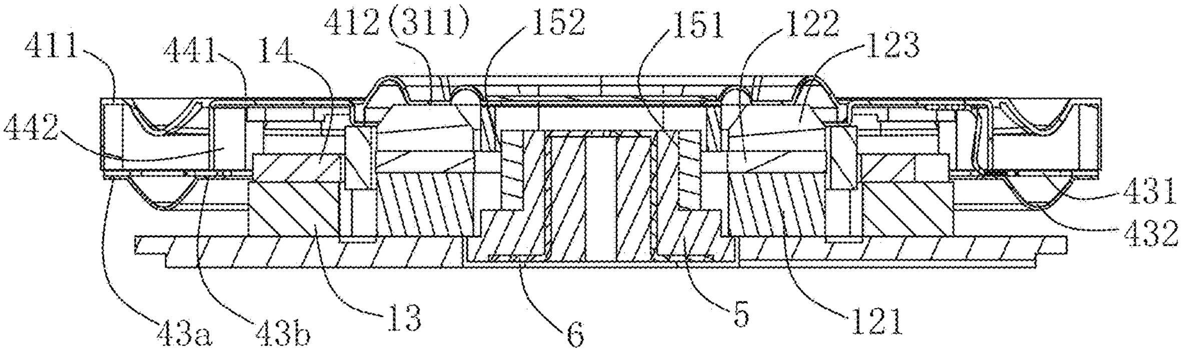
FIG. 3 is a cross-sectional view of the coaxial speaker, taken along line A-A in FIG. 1.
Figure 4:
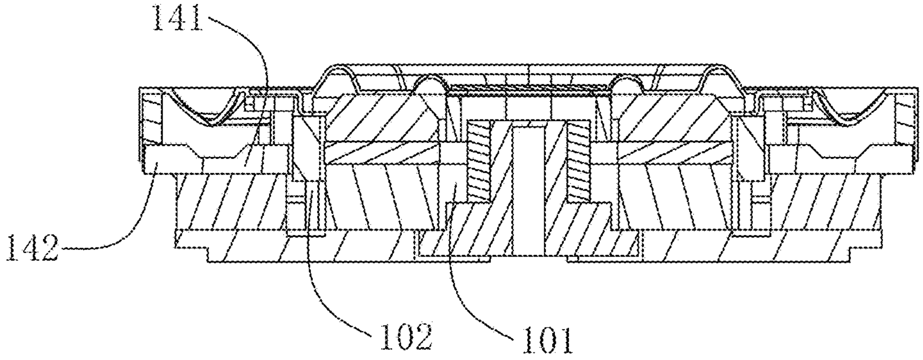
FIG. 4 is a cross-sectional view of the coaxial speaker, taken along line B-B in FIG. 1.

Referring to FIGS. 1-4, the present disclosure discloses a coaxial speaker 100 including a magnetic circuit system 1, a support frame 2 fixed to the magnetic circuit system 1, a first sounding unit 3, a second sounding unit 4, and an insert 5.

The second sounding unit 4 surrounds the first sounding unit 3 and is arranged coaxially with the first sounding unit 3. The first sounding unit 3 includes a first diaphragm 31 and a first voice coil 32 driving the first diaphragm 31 for vibrating and sounding. The second sounding unit 4 includes a second diaphragm 41 and a second voice coil 42 driving the second diaphragm 41 for vibrating and sounding.

The magnetic circuit system 1 includes a bottom plate 11 provided with a through hole 111, a ring magnetic unit 12 fixed to the bottom plate 11, a magnet 13 fixed to the bottom plate 11 and arranged on an outer side of the ring magnetic unit 12, and a yoke 14 fixed to the magnet 13. The insert 5 is inserted into an inner side of the ring magnetic unit 12 through the through hole 111. The magnetic circuit system 1 further includes a first ring magnet 15 sleeved on the insert 5. The first ring magnet 15 includes an inner surface 151 and an outer surface 152 opposite to the inner surface 151. Magnetic polarities of the inner surface 151 and the outer surface 152 are opposite. The ring magnetic unit 12 includes a second ring magnet 121 fixed to the bottom plate 11, a ring yoke 122 fixed to the second ring magnet 121, and a third ring magnet 123 fixed to the ring yoke 122. The second ring magnet 121, the third ring magnet 123 and the magnet 13 are magnetized along a vibration direction of the first voice coil 32 and the second voice coil 42. The second ring magnet 121 and the third ring magnet 123 have the same magnetic polarities facing each other, that are opposite to the magnetic polarity of the outer surface 152. A magnetic polarity of the magnet 13 close to the yoke 14 and the magnetic polarity of the outer surface 152 are the same.

A first magnetic gap 101 is formed by the first ring magnet 15 together with the second ring magnet 121, the ring yoke 122 and the third ring magnet 123. A second magnetic gap 102 is formed by the ring magnetic unit 12 together with the magnet 13 and the yoke 14. The first voice coil 32 locates in the first magnetic gap 101, and the second voice coil 42 locates in the second magnetic gap 102. An outer fixing part 311 of the first diaphragm 31 is fixed to the third ring magnet 123. An outer fixing part 411 of the second diaphragm 41 is fixed to the support frame 2, and an inner fixing part 412 of the second diaphragm 41 is fixed to the third ring magnet 123.

The yoke 14 includes a main body part 141 attached to the magnet 13 and an extension part 142 extending from the main body part 141 in a direction away from the ring magnetic unit 12. The support frame 2 is fixed to the extension part 142.

The second sounding unit 4 further includes an elastic support member 43 spaced apart from the second diaphragm 41 and a skeleton 44 connected between the second diaphragm 41 and the elastic support member 43. An amount of the extension parts 142 is two, the two extension parts 142 are respectively arranged on two opposite long-axis sides of the coaxial speaker 100. An amount of the elastic support members 43 is two, the two elastic support members 43 are respectively arranged on two opposite short-axis sides of the coaxial speaker 100. The skeleton 44 includes a plate part 441 and two support arms 442 extending from the plate part 441 and respectively fixed to the two elastic support members 43. The plate part 441 serves as a part of the second diaphragm 41. Each support arm 442 is arranged between the support frame 2 and the yoke 14. An outer fixing portion **43*a* of each elastic support member 43 is fixed to the support frame 2, and an inner fixing portion 43*b* of each elastic support member 43 is fixed to a corresponding one of the two support arms 442. Optionally, the first diaphragm 31, the second diaphragm 41 and the skeleton 44 are integrally formed, in this embodiment, the outer fixing part 311 of the first diaphragm 31 and the inner fixing part 412 of the second diaphragm 41 are formed into one piece and fixed to the third ring magnet 123**.

The insert 5 is provided with a first step 51 and a second step 52 located above the first step 51. The second ring magnet 121 is partially stacked on the first step 51. The first ring magnet 15 abuts against the second step 52.

A conductive terminal 6 is embedded in the insert 5 for electrically connecting the first voice coil 32. Each elastic support member 43 includes a flexible circuit board 431 fixed to a corresponding one of the two support arms 442 for electrically connecting the second voice coil 42 and an auxiliary diaphragm 432 fixed to a lower surface 4311 of the flexible circuit board 431 away from the second diaphragm 41.

In the coaxial speaker 100 according to the present disclosure, the first ring magnet 15 is sleeved on the insert 5, the inner surface 151 and the outer surface 152 of the first ring magnet 15 have opposite magnetic polarities, the first ring magnet 15 together with the second ring magnet 121, the ring yoke 122 and the third ring magnet 123 forms the first magnetic gap 101 for the first voice coil 32, the ring magnetic unit 12 together with the magnet 13 and the yoke 14 forms the second magnetic gap 102 for the second voice coil 42, the outer fixing part 311 of the first diaphragm 31 and the inner fixing part 412 of the second diaphragm 41 are fixed to the third ring magnet 123, thereby, the vibration amplitude of the first sounding unit 3 can be increased, in addition, since the first ring magnet 15 provides the magnetic field to the first voice coil 32, the low-frequency performance of the first sounding unit 3 can be improved, thereby breaking the limitation of the first sounding unit 3 only emitting high-frequency sound and improving the low-frequency performance of the coaxial speaker 100.

The above are only embodiments of the present disclosure. It should be pointed out that those of ordinary skill in the art may also make improvements without departing from the ideas of the present disclosure, all of which fall within the protection scope of the present disclosure.

What is claimed is:

1. A coaxial speaker, comprising:

a magnetic circuit system;

a support frame fixed to the magnetic circuit system;

a first sounding unit, comprising a first diaphragm and a first voice coil driving the first diaphragm for vibrating and sounding;

a second sounding unit surrounding the first sounding unit and arranged coaxially with the first sounding unit, comprising a second diaphragm and a second voice coil driving the second diaphragm for vibrating and sounding; and an insert;

wherein the magnetic circuit system comprises a bottom plate provided with a through hole, a ring magnetic unit fixed to the bottom plate, a magnet fixed to the bottom plate and arranged on an outer side of the ring magnetic unit, and a yoke fixed to the magnet, the insert is inserted into an inner side of the ring magnetic unit through the through hole, the magnetic circuit system further comprises a first ring magnet sleeved on the insert, the first ring magnet comprises an inner surface and an outer surface opposite to the inner surface, magnetic polarities of the inner surface and the outer surface are opposite, the ring magnetic unit comprises a second ring magnet fixed to the bottom plate, a ring yoke fixed to the second ring magnet, and a third ring magnet fixed to the ring yoke, a first magnetic gap is formed by the first ring magnet together with the second ring magnet, the ring yoke and the third ring magnet, a second magnetic gap is formed by the ring magnetic unit together with the magnet and the yoke, the first voice coil locates in the first magnetic gap, the second voice coil locates in the second magnetic gap, an outer fixing part of the first diaphragm is fixed to the third ring magnet, an outer fixing part of the second diaphragm is fixed to the support frame, an inner fixing part of the second diaphragm is fixed to the third ring magnet.

2. The coaxial speaker as described in claim 1, wherein the insert is provided with a first step and a second step located above the first step, the second ring magnet is partially stacked on the first step, the first ring magnet abuts against the second step.

3. The coaxial speaker as described in claim 1, wherein a conductive terminal is embedded in the insert for electrically connecting the first voice coil.

4. The coaxial speaker as described in claim 1, wherein the yoke comprises a main body part attached to the magnet and an extension part extending from the main body part in a direction away from the ring magnetic unit, the support frame is fixed to the extension part.

5. The coaxial speaker as described in claim 4, wherein the second sounding unit further comprises an elastic support member spaced apart from the second diaphragm and a skeleton connected between the second diaphragm and the elastic support member, an amount of the extension parts is two, the two extension parts are respectively arranged on two opposite long-axis sides of the coaxial speaker, an amount of the elastic support members is two, the two elastic support members are respectively arranged on two opposite short-axis sides of the coaxial speaker, the skeleton comprises a plate part and two support arms extending from the plate part and respectively fixed to the two elastic support members, the plate part serves as a part of the second diaphragm, each support arm is arranged between the support frame and the yoke, an outer fixing portion of each elastic support member is fixed to the support frame, an inner fixing portion of each elastic support member is fixed to a corresponding one of the two support arms.

6. The coaxial speaker as described in claim 5, wherein each elastic support member comprises a flexible circuit board fixed to a corresponding one of the two support arms for electrically connecting the second voice coil and an auxiliary diaphragm fixed to a lower surface of the flexible circuit board away from the second diaphragm.

7. The coaxial speaker as described in claim 5, wherein the first diaphragm, the second diaphragm and the skeleton are integrally formed.

8. The coaxial speaker as described in claim 1, wherein the second ring magnet, the third ring magnet and the magnet are magnetized along a vibration direction of the first voice coil and the second voice coil, the second ring magnet and the third ring magnet have the same magnetic polarities facing each other, that are opposite to the magnetic polarity of the outer surface, a magnetic polarity of the magnet close to the yoke and the magnetic polarity of the outer surface are the same.

* * * * *